(12) United States Patent
Taema

(10) Patent No.: US 8,076,819 B2
(45) Date of Patent: Dec. 13, 2011

(54) ROTARY MACHINE STATOR

(75) Inventor: Yoshihiro Taema, Kanagawa (JP)

(73) Assignee: Fujitsu General Limited, Kanagawa (JP)

(*) Notice: Subject to any disclaimer, the term of this patent is extended or adjusted under 35 U.S.C. 154(b) by 0 days.

(21) Appl. No.: 12/942,699

(22) Filed: Nov. 9, 2010

(65) Prior Publication Data
US 2011/0109189 A1 May 12, 2011

(30) Foreign Application Priority Data
Nov. 10, 2009 (JP) ................. 2009-257400

(51) Int. Cl.
H02K 3/34 (2006.01)

(52) U.S. Cl. .......... 310/215; 310/214; 310/260

(58) Field of Classification Search .......... 310/215, 310/214, 260, 194, 216.114–216.115, 216.082
See application file for complete search history.

(56) References Cited

U.S. PATENT DOCUMENTS
| 4,904,893 A * | 2/1990 | Snider et al. ............... 310/260 |
| 6,414,413 B1 * | 7/2002 | Arai et al. .................. 310/214 |
| 6,930,427 B2 * | 8/2005 | Grant et al. ............ 310/216.016 |

FOREIGN PATENT DOCUMENTS
| JP | 06153432 A * | 5/1994 |
| JP | 3754349 | 3/2006 |

* cited by examiner

Primary Examiner — Quyen Leung
Assistant Examiner — Leda Pham
(74) Attorney, Agent, or Firm — McDermott Will & Emery LLP

(57) ABSTRACT

According to one embodiment, a rotary machine stator includes a cylindrical stator core, an insulating film, and a ring-shaped insulator. The stator core includes a slot and a slot opening. The insulating film is formed cylindrical to be in close contact with the inner surface of the slot. The insulating film includes a gate on both ends that is bent to form a film opening as wide as or wider than the slot openings. The insulating film is inserted in the slot such that a film axial direction end of the insulating film protrudes from an axial direction end of the stator core. The insulator is attached to both ends of the stator core. The insulator includes an insulator slot and an insulator opening in substantially the same shape as the slot and the slot opening, respectively, and a lock to lock the film axial direction end.

2 Claims, 5 Drawing Sheets

ROTARY MACHINE STATOR

CROSS-REFERENCE TO RELATED APPLICATION(S)

This application is based upon and claims the benefit of priority of the prior Japanese Patent Application No. 2009-257400, filed on Nov. 10, 2009, the entire contents of which are incorporated herein by reference.

FIELD

The embodiments discussed herein are directed to a stator of a rotary machine.

BACKGROUND

For example, Japanese patent No. 3754349 discloses a conventional technology related to a brushless direct current (DC) motor including an insulating material arranged in a slot of the stator and a slot opening between teeth, and a winding wire directory provided to the teeth from above the insulating material. The four corners of the rectangular insulating material are cut off to form diagonal portions. At the end of the insulating material located between the teeth, the diagonal portions are provided to be inclined with respect to the center line between the teeth. The insulating material is a polyester film with a thickness of 0.2 to 0.5 mm.

With this conventional technology, the insulating material is arranged in the slot opening between the teeth of the stator. Accordingly, the nozzle of a wire winding machine touches the insulating material while moving between the teeth. This causes friction with the insulating material, thereby reducing the insulating ability.

SUMMARY

According to an aspect of the present invention, a rotary machine stator includes a stator core, an insulating film, and an insulator. The stator core is in a cylindrical shape, and includes a slot and a slot opening between top edges. The insulating film is formed in a cylindrical shape to be in close contact with an inner surface of the slot. The insulating film includes a gate on both ends in the circumferential direction that is bent inside to form a film opening having a width equal to or larger than a width of the slot opening. The insulating film is configured to be inserted in the slot such that a film axial direction end of the insulating film protrudes from an axial direction end of the stator core. The insulator is in a ring shape and attached to both ends of the stator core in the axial direction. The insulator includes an insulator slot and an insulator opening between insulator edges formed in substantially the same shape as the slot and the slot opening between the top edges of the stator core, respectively. The insulator edges are provided with a lock on a side of the insulator slot to insert and lock the film axial direction end near the gate of the insulating film.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWING(S)

DESCRIPTION OF THE EMBODIMENT(S)

Exemplary embodiments of the present invention will be described in detail with reference to the accompanying drawings.

Figure 1:
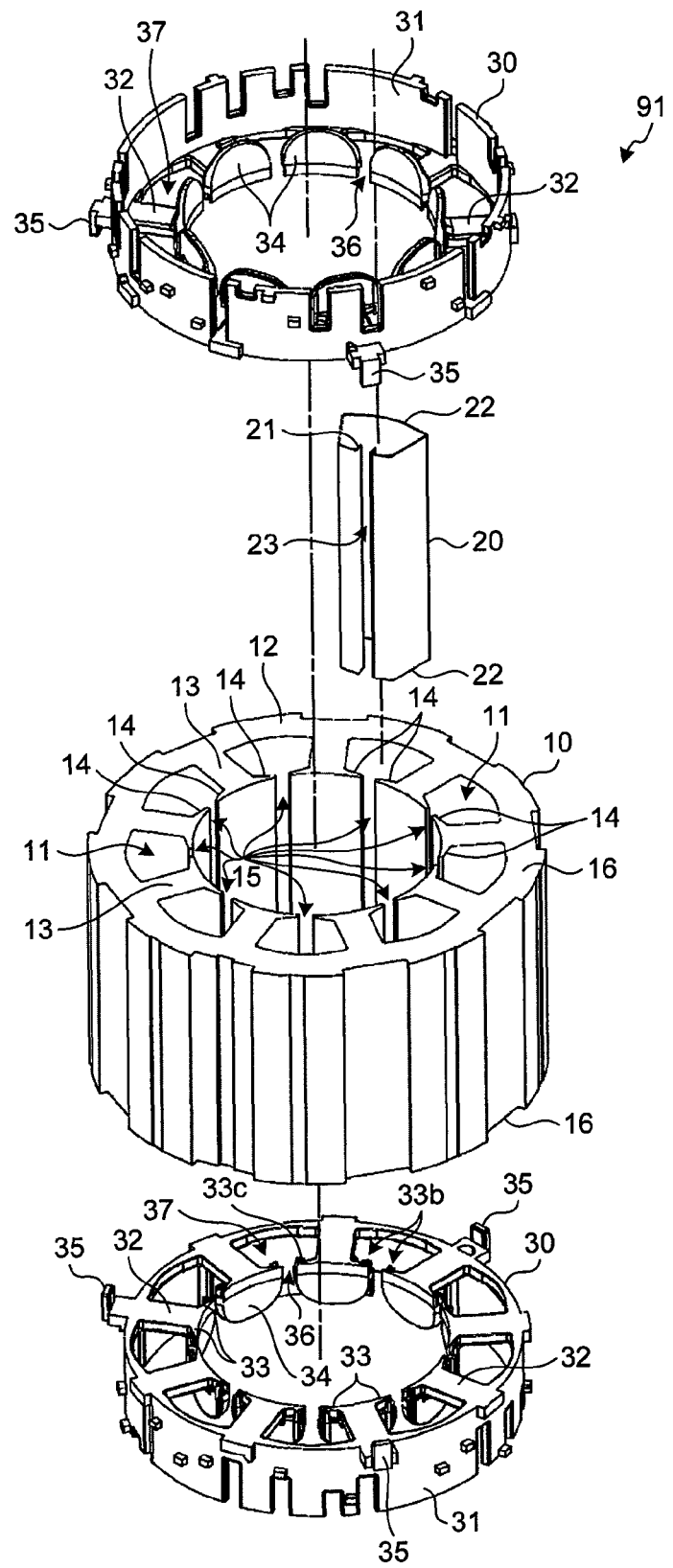
FIG. 1 is an exploded perspective view of a rotary machine stator according to a first embodiment.
Figure 2:
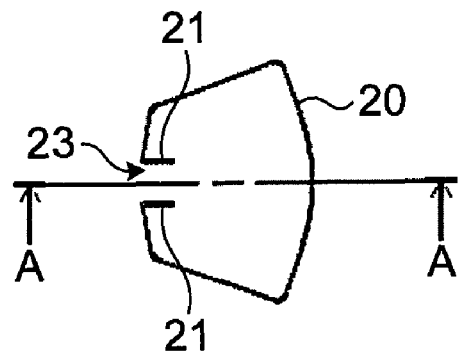
FIG. 2 is a plan view of an insulating film illustrated in FIG. 1.
Figure 3:
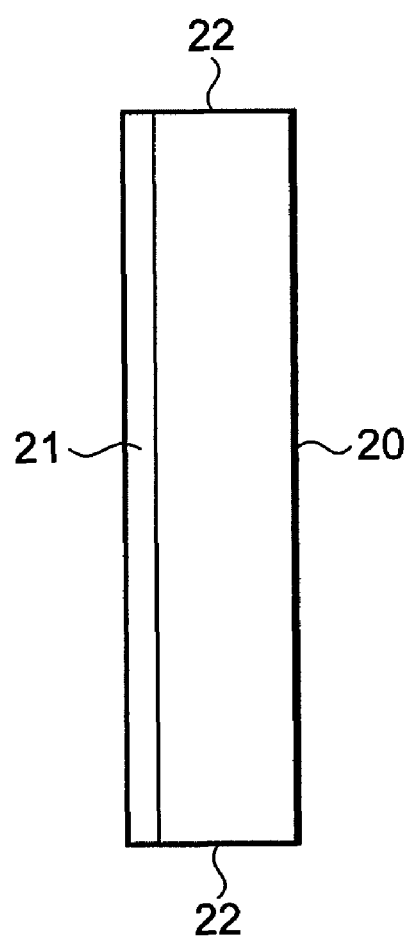
FIG. 3 is a cross-sectional view taken along line A-A in FIG. 2.
Figure 4:
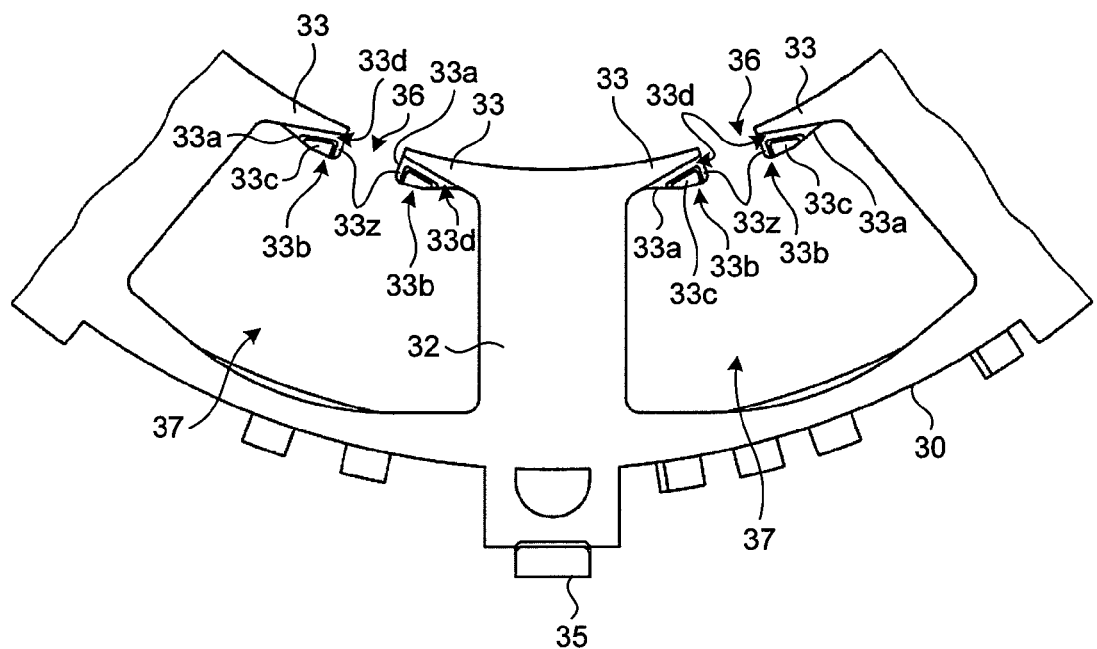
FIG. 4 is a plan view of part of an insulator viewed from the side of a stator core illustrated in FIG. 1.
Figure 5:
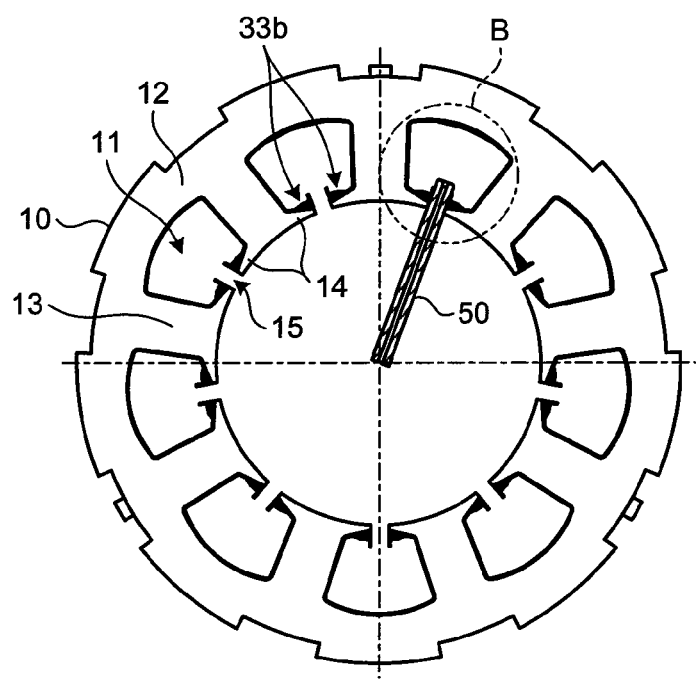
FIG. 5 is a horizontal cross-section of the stator core in the state where the insulating film and the insulator are arranged and the nozzle of a wire winding machine is inserted in a slot opening.
Figure 6:
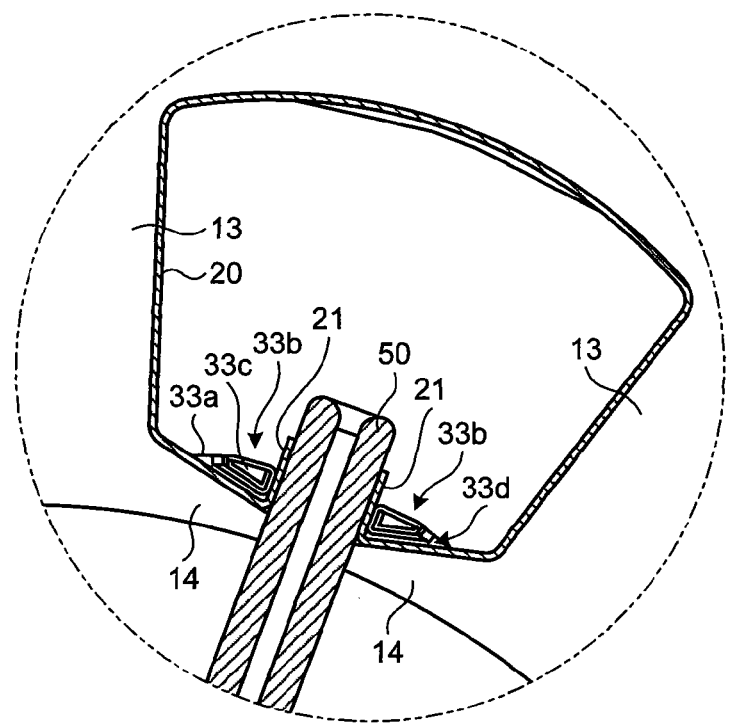
FIG. 6 is an enlarged view of a portion indicated by B in FIG. 5.
Figure 7:
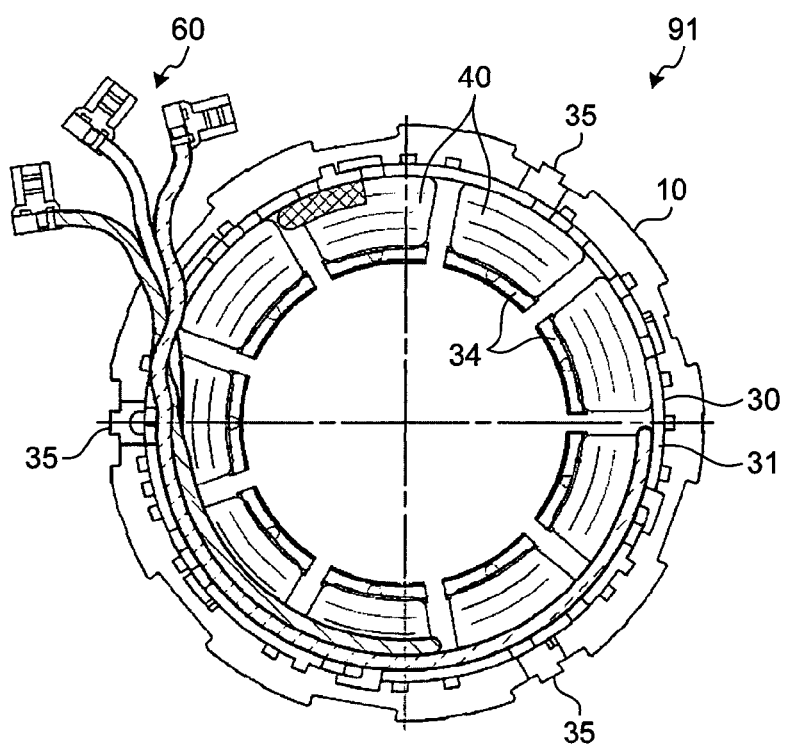
FIG. 7 is a plan view of the rotary machine stator wound with a coil.
Figure 8:
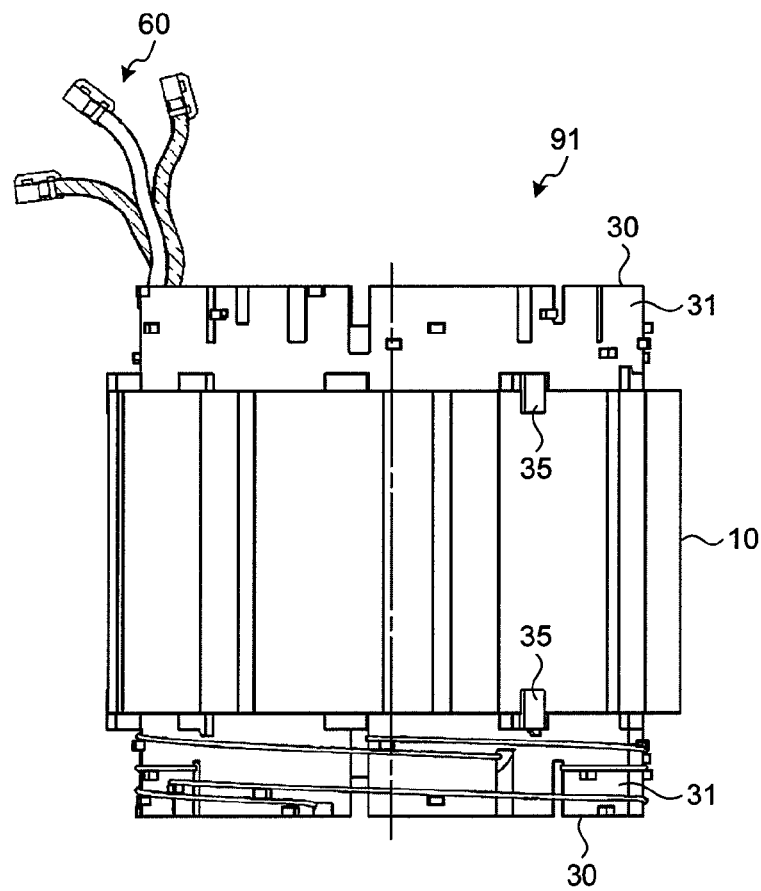
FIG. 8 is a side view of the rotary machine stator wound with the coil.

FIG. 1 is an exploded perspective view of a rotary machine stator according to a first embodiment. FIG. 2 is a plan view of an insulating film. FIG. 3 is a cross-sectional view taken along line A-A in FIG. 2. FIG. 4 is an enlarged plan view of part of an insulator viewed from the side of a stator core. FIG. 5 is a horizontal cross-section of the stator core in the state where the insulating film and the insulator are arranged and the nozzle of a wire winding machine is inserted in a slot opening. FIG. 6 is an enlarged view of a portion indicated by B in FIG. 5. FIG. 7 is a plan view of the rotary machine stator wound with a coil. FIG. 8 is a side view of the rotary machine stator wound with the coil.

As illustrated in FIG. 1, a rotary machine stator 91 includes a stator core 10, an insulating film 20, and an insulator 30. The stator core 10 is inserted in a slot 11 of the stator core 10 to insulate between the slot 11 and a coil 40 (see FIG. 7). The insulator 30 is provided to an axial direction end 16 on both ends of the stator core 10 in the axial direction to insulate between the axial direction end 16 and the coil 40.

The stator core 10 is made of a magnetic steel plate punched into rings, which are stacked to form a cylinder. The stator core 10 includes a ring yoke 12, teeth 13, and top edges 14. The teeth 13 extend from the yoke 12 to the center, while the top edges 14 extend from the end of the teeth 13 in the circumferential direction.

The fan-shaped slot 11 is formed such that it is surrounded by the yoke 12, the teeth 13, and the top edges 14. Slot openings 15 are formed as spaces each between a facing pair of the top edges 14.

As illustrated in FIGS. 1 to 3 and 6, the insulating film 20 is made of a polyester film, and is bent into a cylinder having a fan-shaped cross section to be in close contact with the inner surface of the slot 11. At this time, a gate 21 on both ends in the circumferential direction is bent toward the inside of the cylinder to form a film opening 23 having an opening width equal to or larger than that of the slot openings 15. The insulating film 20 is longer than the stator core 10 in the axial direction. Accordingly, when the insulating film 20 is inserted in the slot 11, a film axial direction end 22 on both ends of the insulating film 20 in the axial direction protrudes from the axial direction end 16 of the stator core 10.

The insulating film of the first embodiment is not limited to the one described above, and may be modified in various manners depending on equipment to which the rotary machine is applied. For example, if the rotary machine is applied to a compressor that compresses a refrigerant, a flame-proof insulating film, such as a polyphenylene sulfide film, an insulating film made of aramid fiber, etc., is preferably used instead of a polyester film.

The gate 21 ensures an insulation creepage distance (2.4 mm or more) between the coil 40 and the stator core 10 when the coil 40 is wound around the stator core 10.

As illustrated in FIGS. 1, 4 and 6, the insulator 30 is formed into a short cylinder. The insulator 30 includes an outer circumference wall 31, a hoisting drum 32, an insulator edge 33, an inner guard 34, and three outer claws 35. The outer circumference wall 31 is located on the yoke 12 of the stator core 10. The hoisting drum 32 extends from the outer circumference wall 31 on the stator core 10 side toward the center and covers the teeth 13 of the stator core 10. The insulator edge 33 extends from the end of the hoisting drum 32 in the circumferential direction. The inner guard 34 is located on a side of the insulator edge 33 opposite the stator core 10. The outer claws 35 are fitted in the outer circumference of the stator core 10 to fix the insulator 30 to the stator core 10.

An insulator slot 37 and an insulator opening 36 are formed in substantially the same shape as the slot 11 and the slot opening 15 of the stator core 10, respectively, such that they are surrounded by the outer circumference wall 31 on the stator core 10 side, the hoisting drum 32, and the insulator edge 33.

As illustrated in FIGS. 4 and 6, as a salient feature of the rotary machine stator 91 of the first embodiment, a protrusion 33a is formed in the insulator edge 33. The protrusion 33a protrudes toward the insulator slot 37. The protrusion 33a is provided with a lock 33b. The film axial direction end 22 near the gate 21 of the insulating film 20 is inserted in the lock 33b such that the insulating film 20 is arranged along the slot 11.

The lock 33b of the first embodiment includes a lock claw 33c and a lock groove 33d. The lock claw 33c extends from the protrusion 33a toward the stator core 10 in the axial direction. The lock groove 33d is formed between the lock claw 33c and the insulator edge 33. The side of the lock claw 33c on the insulator opening 36 side is shifted from the end of the insulator edge 33 toward a side opposite the opening by the thickness of the insulating film 20 or more. This provides a gap 33z equal to or larger than the thickness of the insulating film 20 between the side of the lock claw 33c on the insulator opening 36 side and the insulator opening 36. The gate 21 of the insulating film 20 is located in a space formed by the gap 33z. Accordingly, the opening width of the film opening 23 of the insulating film 20 is equal to or larger than that of the slot openings 15. The side of the lock claw 33c is tapered to facilitate the insertion of the film axial direction end 22 of the insulating film 20. Thus, the lock groove 33d closer to the stator core 10 is wider.

To assemble the rotary machine stator 91 of the first embodiment, first, the insulating film 20 is inserted into the slot 11 of the stator core 10 such that the film axial direction end 22 on both ends of the insulating film 20 protrudes from the axial direction end 16 of the stator core 10. Next, the film axial direction end 22 of the insulating film 20 is inserted into the insulator slot 37 and the lock groove 33d. Thus, the insulator 30 is arranged at the axial direction end 16 of the stator core 10.

The film axial direction end 22 of the insulating film 20 inserted in the lock groove 33d is supported by the lock claw 33c such that it is close contact with each of the top edges 14 of the stator core 10. Accordingly, the entire insulating film 20 is supported to be arranged along the inner wall of the slot 11. Besides, the side of the lock claw 33c on the insulator opening 36 side is shifted toward a side opposite the opening by the thickness of the insulating film 20 or more. Accordingly, the opening width of the film opening 23 of the insulating film 20 is equal to or larger than that of the slot openings 15.

After that, as illustrated in FIGS. 5 and 6, the coil 40 is wound around the stator core 10, in which the inner surface of the slot 11 is covered with the insulating film 20 and the axial direction end 16 is covered with the insulator 30, by a nozzle 50 of a wire winding machine.

The nozzle 50 passes through one of the slot openings 15 from the top to the bottom. The nozzle 50 moves to adjacent one of the slot openings 15 and passes through the adjacent slot opening 15 from the top to the bottom, and then returns to the previous slot opening 15. At this time, since the film opening 23 of the insulating film 20 is wider than the slot opening 15, the nozzle 50 does not cause friction with the gate 21 of the insulating film 20.

If a position where the insulating film 20 is inserted into the slot 11 of the stator core 10 is shifted and the gate 21 protrudes on the slot opening 15 side, the nozzle 50 causes friction with the gate 21. In this case, however, the insulating film 20 is pushed and widened by the nozzle 50, which resolves the position shift. Thus, the nozzle 50 does not cause friction with the gate 21 again. This process is performed as one cycle and, as illustrated in FIGS. 7 and 8, the coil 40 is wound a predetermined number of times around all the teeth 13. Then, the end of the coil 40 is connected to a lead wire 60, and thereby the rotary machine stator 91 of the first embodiment is complete.

As described above, according to the first embodiment, the rotary machine stator 91 includes the insulating film 20 and the insulator 30. The insulating film 20 is provided with the gate 21 bent inside to form the film opening 23 having an opening width equal to or larger than that of the slot opening 15. The insulating film 20 is inserted in the slot 11. The insulator 30 is provided with the lock 33b that allows the film axial direction end 22 near the gate 21 of the insulating film 20 to be inserted in the insulator edge 33 such that the insulating film 20 is arranged along the slot 11. The lock 33b also allows the film opening 23 to be as wide as or wider than the slot opening 15. Thus, the nozzle 50 of the wire winding machine does not cause friction with the gate 21 of the insulating film 20, and thereby does not reduce the insulating ability of the insulating film 20.

Figure 9:
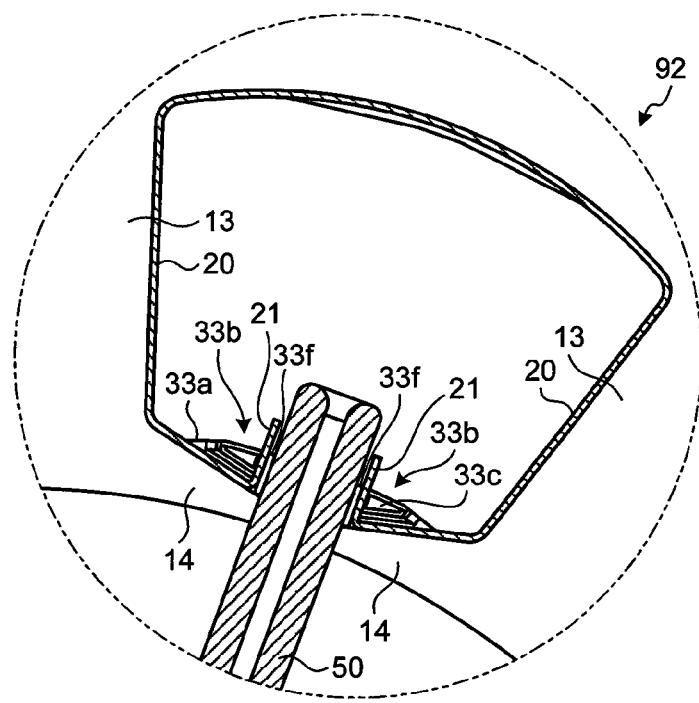
FIG. 9 is an enlarged horizontal cross-section of part of a stator core in the state where an insulating film and an insulator are arranged and the nozzle of a wire winding machine is inserted in a slot opening according to a second embodiment.

FIG. 9 is an enlarged horizontal cross-section of part of a stator core in the state where an insulating film and an insulator are arranged and the nozzle of a wire winding machine is inserted in a slot opening according to a second embodiment. In a rotary machine stator 92 of the second embodiment, the film opening 23 of the insulating film 20 (see FIG. 1) is formed wider than the slot opening 15 of the stator core 10 (see FIG. 1).

The insulator edge 33 of the insulator 30 (see FIG. 1) is provided with the lock 33b (see FIG. 9) to which the film axial direction end 22 near the gate 21 of the insulating film 20 is inserted to be locked. The insulator edge 33 of the insulator 30 is further provided with a guide 33f. The guide 33f guides the axial direction end of the gate 21 in between the lock claws 33*c* (the locks 33*b*) and prevents the gate 21 from being out on the slot opening 15 side. Otherwise, the rotary machine stator 92 of the second embodiment is basically similar to the rotary machine stator 91 of the first embodiment.

As described above, according to the second embodiment, the rotary machine stator 92 is provided with the guide 33*f* that guides the axial direction end of the gate 21 to prevent the gate 21 from being out on the slot opening 15 side. Accordingly, the gate 21 can be reliably arranged on a side opposite the slot opening, and is prevented from being out on the slot opening 15 side. Thus, the nozzle 50 of the wire winding machine does not cause friction with the gate 21 of the insulating film 20, and thereby does not reduce the insulating ability of the insulating film 20.

According to an embodiment, the nozzle of a wire winding machine does not cause friction with the insulating film. Thus, the insulating ability of the insulating film can be maintained.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A rotary machine stator comprising:
   a stator core in a cylindrical shape, the stator core including a slot and a slot opening between top edges;
   an insulating film formed in a cylindrical shape to be in close contact with an inner surface of the slot, the insulating film including a gate on both ends in a circumferential direction that is bent inside to form a film opening having a width equal to or larger than a width of the slot opening, the insulating film configured to be inserted in the slot such that a film axial direction end of the insulating film protrudes from an axial direction end of the stator core; and
   an insulator in a ring shape attached to both ends of the stator core in an axial direction, the insulator including an insulator slot and an insulator opening between insulator edges formed to be substantially identical in shape with the slot and the slot opening between the top edges of the stator core, respectively, the insulator edges provided with a lock on a side of the insulator slot to insert and lock the film axial direction end near the gate of the insulating film.

2. A rotary machine stator according to claim 1, wherein the width of the film opening of the insulating film is larger than the width of the slot openings of the stator core, and
   in addition to the lock to insert and lock the film axial direction end near the gate of the insulating film, the insulator edges of the insulator are further provided with a guide to insert and guide an axial direction end of the gate.

* * * * *